(12) United States Patent
Haralabidis

(10) Patent No.: US 9,197,278 B2
(45) Date of Patent: Nov. 24, 2015

(54) REFERENCE OSCILLATOR ARBITRATION AND SCHEDULING FOR MULTIPLE WIRELESS SUBSYSTEMS

(75) Inventor: Nikolaos Haralabidis, Athens (GR)

(73) Assignee: Broadcom Corporation, Irvine, CA (US)

( * ) Notice: Subject to any disclaimer, the term of this patent is extended or adjusted under 35 U.S.C. 154(b) by 537 days.

(21) Appl. No.: 13/463,976

(22) Filed: May 4, 2012

(65) Prior Publication Data

US 2013/0115905 A1 May 9, 2013

Related U.S. Application Data

(60) Provisional application No. 61/556,094, filed on Nov. 4, 2011.

(30) Foreign Application Priority Data

Apr. 18, 2012 (GR) .............................. 20120100220

(51) Int. Cl.
*H04B 1/403* (2015.01)
*H04B 1/00* (2006.01)

(52) U.S. Cl.
CPC ................ *H04B 1/406* (2013.01); *H04B 1/005* (2013.01); *H04B 2215/065* (2013.01)

(58) Field of Classification Search
CPC .......... H03J 7/04; H04B 1/406; H04B 1/005; H04B 2215/065; H03L 7/18
USPC ........................................................ 455/259
See application file for complete search history.

(56) References Cited

U.S. PATENT DOCUMENTS 6,564,039 B1    5/2003   Meador et al.
6,697,016 B1    2/2004   Voor et al.
(Continued)

FOREIGN PATENT DOCUMENTS

CN    1522488 A    8/2004
CN    1685245 A    10/2005
(Continued)

OTHER PUBLICATIONS

Search Report from European Patent Application No. 12006126.2, dated Nov. 15, 2013, 3 pages.
(Continued)

*Primary Examiner* — Bobbak Safaipour
*Assistant Examiner* — Devan Sandiford
(74) *Attorney, Agent, or Firm* — Sterne, Kessler, Goldstein & Fox P.L.L.C.

(57) ABSTRACT

Systems and methods are described for controlling a reference oscillator shared by multiple subsystems of a communications system and arbitrating usage of the reference oscillator among these subsystems. By changing the properties of the reference oscillator (e.g., by tuning the reference oscillator) according to the needs of particular subsystem(s), the communications system can configure the reference oscillator to meet the specification requirements of these particular subsystem(s) and can later reconfigure the reference oscillator to meet the needs of other subsystems. Further, the controller can configure the subsystems based on parameters that impact multiple subsystems (e.g., by implementing geographic awareness, spectrum occupation awareness, and availability of Assisted GPS (AGPS) functionality) to achieve further optimization of the communications system.

19 Claims, 6 Drawing Sheets

(56) References Cited

U.S. PATENT DOCUMENTS

| | | |
|---|---|---|
| 7,103,127 B2 | 9/2006 | Damgaard et al. |
| 7,209,716 B2 | 4/2007 | Maeda et al. |
| 8,036,311 B2 | 10/2011 | Wardrop et al. |
| 8,532,576 B2 | 9/2013 | Kawamura et al. |
| 2002/0049075 A1 | 4/2002 | Takagi |
| 2004/0192346 A1* | 9/2004 | Chang et al. ............... 455/456.1 |
| 2005/0170776 A1* | 8/2005 | Siorpaes ...................... 455/41.2 |
| 2007/0066314 A1* | 3/2007 | Sherman et al. ............. 455/445 |
| 2008/0001681 A1 | 1/2008 | Yuan et al. |
| 2008/0004039 A1* | 1/2008 | Ober et al. ................. 455/456.1 |
| 2008/0080463 A1 | 4/2008 | Stewart et al. |
| 2008/0192806 A1* | 8/2008 | Wyper et al. ................. 375/133 |
| 2008/0207126 A1* | 8/2008 | Grushkevich et al. ....... 455/41.2 |
| 2009/0201092 A1* | 8/2009 | Yuan et al. ........................ 331/2 |
| 2010/0137025 A1* | 6/2010 | Tal et al. .................... 455/553.1 |
| 2010/0316027 A1* | 12/2010 | Rick et al. .................... 370/336 |
| 2011/0075778 A1* | 3/2011 | Chang et al. ................. 375/354 |
| 2011/0076945 A1* | 3/2011 | Chang et al. ................. 455/41.2 |
| 2011/0136472 A1* | 6/2011 | Rector et al. ................. 455/411 |
| 2012/0083304 A1* | 4/2012 | Yang et al. .................... 455/507 |
| 2012/0134390 A1* | 5/2012 | Smadi ........................... 375/133 |
| 2012/0163314 A1* | 6/2012 | Lee et al. ...................... 370/329 |

FOREIGN PATENT DOCUMENTS

| | | |
|---|---|---|
| CN | 1925338 A | 3/2007 |
| CN | 101098157 A | 1/2008 |
| CN | 101523766 A | 9/2009 |
| TW | 200904059 A | 1/2009 |

OTHER PUBLICATIONS

Jarusombat, S., et al., "Digital Signature on Mobile Devices Based on Location," IEEE, International Symposium on Communications and Information Technologies (ISCIT '06), Sep. 20-Oct.18, 2006; pp. 866-870.

\* cited by examiner

US 9,197,278 B2

REFERENCE OSCILLATOR ARBITRATION AND SCHEDULING FOR MULTIPLE WIRELESS SUBSYSTEMS

CROSS-REFERENCE TO RELATED APPLICATIONS

This patent application claims the benefit of U.S. Provisional Patent Application No. 61/556,094, filed Nov. 4, 2011, entitled "Long Term Evolution Radio Frequency Integrated Circuit," which is incorporated herein by reference in its entirety.

FIELD OF THE INVENTION

This invention relates to cellular communications and more specifically to reference oscillators used for cellular communications.

BACKGROUND

In electronic devices, oscillators (e.g., a digitally controlled crystal oscillators (DCXOs)) can be used to produce a periodic signal (e.g., a sine wave) at a certain frequency. These repetitive signals generated by oscillators can be used, for example, as clock signals input to various subsystems of an electronic device. Because oscillators can be relatively expensive to manufacture, the cost of producing a device increases as more oscillators are incorporated into the device. Further, including multiple oscillators in a device can take up board area, or semiconductor substrate area, that could otherwise be used by other components.

Different subsystems can be associated with different standards. A Bluetooth (BT) subsystem may be designed to conform to the requirements of a first standard, and a wireless local area network (WLAN) subsystem may be designed to conform to the requirements of a second standard. These standards may impose different specifications and requirements for their respective oscillators. For example, each subsystem and associated standard can have different specifications for reference oscillator properties (e.g., noise, thermal stability, etc.) and reference oscillator behavior during operation (e.g., frequency drift or abrupt frequency steps in platforms using DCXOs). Additionally, a standard may prohibit certain actions, such as transmitting above a certain power level, producing certain emissions, and jamming adjacent channels. Further, in some cases, additional requirements may be imposed by hardware and/or software used to implement the various subsystems.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
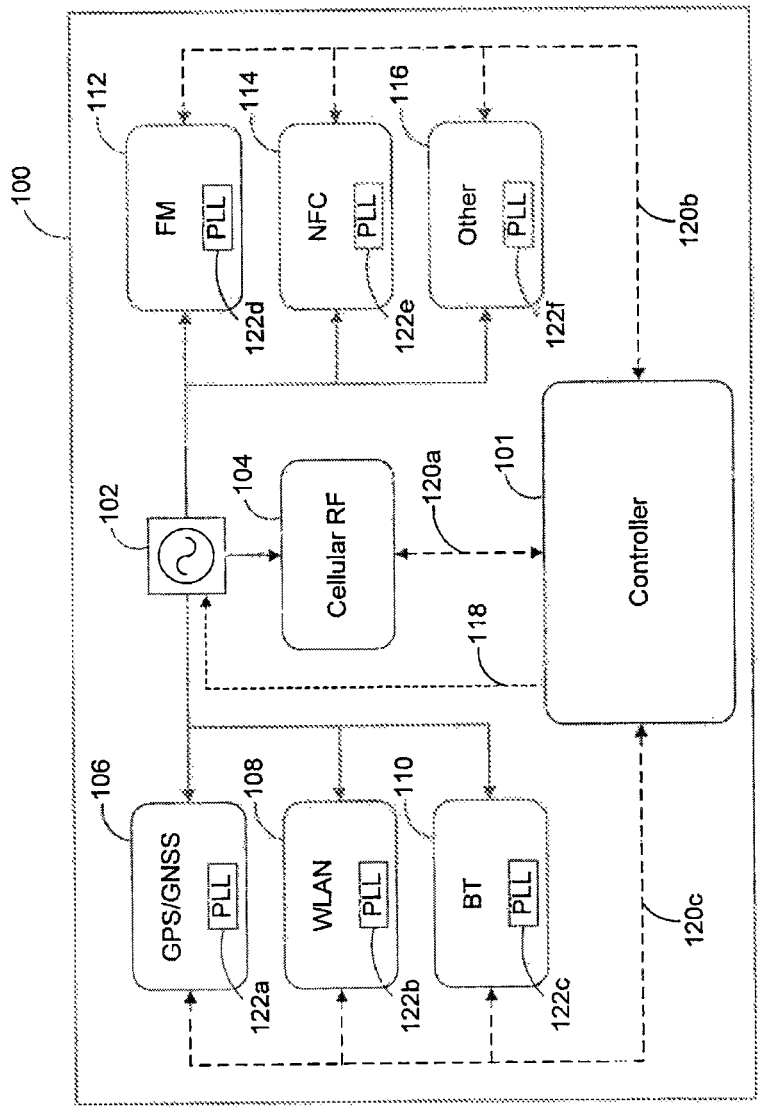
FIG. 1 is a block diagram of a system for arbitrating usage of a shared reference oscillator among subsystems.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. Overview

Embodiments of the present disclosure provide systems and methods for controlling a reference oscillator shared by multiple subsystems in a communication system and arbitrating usage of the reference oscillator among these subsystems. By changing the properties of the reference oscillator (e.g., by tuning the reference oscillator) according to the needs of particular subsystem(s), the communications system can configure the reference oscillator to meet the specification requirements of these particular subsystem(s) and can later reconfigure the reference oscillator to meet the needs of other subsystems.

For example, a central controller and/or arbitrator in a communications system can receive requests to use the reference oscillator from one or more subsystems and adjust the reference oscillator to achieve the required properties of the requesting subsystem(s). The central controller can also ensure that other subsystems with conflicting reference oscillator requirements are not negatively impacted by an upcoming adjustment of the reference oscillator. For example, the controller can notify each subsystem of the upcoming change(s) to the reference oscillator properties. The controller can also enable or disable operation of the subsystems if the new operating characteristics of the reference oscillator will have a negative impact on particular subsystems. In some cases, multiple subsystems may be able to continue operation even after the reference oscillator has been retuned (e.g., because the characteristics of the retuned reference oscillator still meets the requirements of these subsystems). In other cases, some subsystems may have to be adjusted or disabled before the reference oscillator is retuned (e.g., because the retuned reference oscillator no longer meets the requirements of these subsystems).

If multiple subsystems require use of the reference oscillator at the same time, the controller can implement an arbitration scheme to prioritize requests from the subsystems. In an embodiment, the controller can be configured to use a priority list to determine the priority of incoming requests. If a higher priority request is received by the controller while the reference oscillator has been configured to accommodate a lower priority request, the controller can reconfigure the reference oscillator to meet the needs of the higher priority request. For example, a cellular subsystem may be prioritized over a Bluetooth subsystem when an incoming call is detected so that the incoming phone call is not missed. If the reference oscillator is currently configured to meet the requirements of the Bluetooth subsystem, the controller can reconfigure the reference oscillator to meet the needs of the cellular subsystem. The controller can optionally re-adjust the reference oscillator to meet the requirements of the Bluetooth subsystem after the incoming call has been processed.

By implementing a reference oscillator arbitration scheme according to embodiments of the present disclosure, multiple subsystems of a communications system can share the use of a single reference oscillator, which advantageously leads to a reduced manufacturing cost for producing the communications system because fewer reference oscillators are needed to support multiple subsystems. Further, reducing the number of required reference oscillators in a communications system advantageously reduces the required board area or semiconductor substrate area, which enables smaller and/or more compact devices to be produced.

2. Arbitrating Usage of a Shared Reference Oscillator Among Subsystems

A system for arbitrating usage of a shared reference oscillator among subsystems will now be described with reference to FIG. 1. FIG. 1 is a block diagram of a communications system 100 including multiple subsystems according to embodiments of the present disclosure. In an embodiment, communications system 100 is implemented on a communications device (e.g., a mobile device such as a cellular handset, smart phone, etc.). However, it should be understood that the elements of FIG. 1 can be implemented on any electronics device having multiple subsystems that require a reference oscillator input signal for operation.

In FIG. 1, controller 101 controls reference oscillator 102 (e.g., by issuing control command(s) 118 to reference oscillator 102) and arbitrates usage of reference oscillator 102 among the various subsystems of FIG. 1 (e.g., by issuing arbitration information or command(s) 120 to subsystems 104-116). In an embodiment, controller 101 may be implemented as a discrete part or as a function inside a larger component (e.g., a modem). Controller 101 interfaces with cellular radio frequency (RF) module 104 to collectively provide cellular communications functionality (e.g., for a cellular handset). Controller 101 also interfaces with several subsystems used to provide wireless functionality for the communications system. In an embodiment, these wireless subsystems include Global Positioning System (GPS)/Global Navigation Satellite System (GNSS) subsystem 106, wireless local area network (WLAN) subsystem 108, Bluetooth (BT) subsystem 110, frequency modulation (FM) subsystem 112, and near field communication (NFC) subsystem 114. For clarity, subsystems used to support wireless functionality are shown in FIG. 1. However, it should be understood that many other subsystems (e.g., microphone subsystem(s), audio, display subsystem(s), input/output subsystem(s), etc.) of a communications system can be coupled to controller 101. These other subsystems are represented in FIG. 1 by block 116.

As previously discussed, each of these subsystems can have different requirements for reference oscillator 102. Controller 101 can receive requests from each of these subsystems and can configure reference oscillator 102 to meet the needs of a particular requesting subsystem. In an embodiment, the request sent from the subsystems can include information regarding preferred operating properties of the reference oscillator that can include, for example: noise level, oscillation frequency, signal amplitude, or other known oscillator requirements. Controller 101 can reconfigure reference oscillator 102 (e.g., using control command 118) so that the characteristics of reference oscillator 102 are altered to match (or more closely meet) the preferred operating properties sent in the request from the subsystem. While requests are generally described herein as originating from subsystems 104-116, it should be understood that controller 101 can also initiate a change the characteristics of reference oscillator 102, based on its own knowledge of system performance or requirements. For example, in an embodiment, controller 101 can detect a condition (e.g., potential RF performance impairment) and can generate a control command 118 to retune reference oscillator 102.

2.1 Priority of Requests

Controller 101 can be configured to implement an arbitration scheme for subsystems 104-116 so that reference oscillator 102 can be configured to meet the needs of subsystems 104-116 on a prioritized basis. In an embodiment, this arbitration scheme is implemented using a priority list accessible by (or implemented on) controller 101. For example, controller 101 may access a priority list stored in a memory (not shown). In an embodiment, this priority list can specify the relative priority of subsystems 104-116. For example, in an embodiment, Bluetooth subsystem 110 may be prioritized above GPS/GLASS subsystem 106, and cellular system 104 may be prioritized over both. The priority list can also specify certain high priority events. For example, an incoming, call may be listed in the priority list as a very high priority event. While the arbitration scheme implemented by controller 101 is described herein with reference to a priority list, it should be understood that controller 101 can be configured to support multiple methods of determining and assigning priority to the subsystems of FIG. 1. Further, in an embodiment, the priority of subsystems 104-116 can be configured and/or reconfigured by a user based on the needs or desires of the user.

When controller 101 receives a request for a reference oscillator signal from a subsystem, controller 101 can determine the priority of the requesting subsystem (e.g., by checking the priority list). If multiple requests are received, controller 101 can determine the priority of each of these requests, order the requests according to their priority, and store them (e.g., in a queue, stack, linked list, array, etc.) so that they can be processed in order of their priority. When a new request is received, the controller determines its priority and decides, based on its priority and the priority of the stored requests, when it should be executed. For example, if controller 101 is currently storing requests from NFC subsystem 114 and Bluetooth subsystem 110 and receives a new request from cellular subsystem 104 stating that an incoming call has been detected, controller 101 may decide to process the incoming call even though requests from NFC subsystem 114 and Bluetooth subsystem 110 have been received earlier.

Controller 101 may be configured to assign priority in a variety of ways. For example, in an embodiment, controller 101 may consider timing of requests when determining how to assign priority. For example, controller 101 may assign a higher priority to older requests than earlier requests so that all requests are eventually processed. For example, controller 101 may place requests in a priority queue and may process events in the order in which they were received unless a high priority event is encountered. In another embodiment, each subsystem can be associated with a specific priority, and requests can be processed according to the priority of the subsystem regardless of the order in which the requests are received. For example, in an embodiment, cellular subsystem 104 can be assigned the highest priority, GPS/GNSS subsystem 106 can be assigned the second highest priority, WLAN subsystem 108 can be assigned the third highest priority, etc.

In some embodiments, controller 101 may consider the reference oscillator requirements associated with all pending requests when determining how to assign priority to the pending requests. For example, some subsystems may be associated with less stringent reference oscillator requirements than other subsystems. By selecting characteristic values for the reference oscillator (e.g., frequency, amplitude, etc.) to meet the needs of the largest possible number of requesting subsystems, controller 101 may be able to process several requests simultaneously by initiating a single reconfiguration of reference oscillator 102 to meet the (relatively lax) requirements of these subsystems.

2.2 Notification of Reconfiguration of Reference Oscillator

After controller 101 determines which request should be processed, controller 101 can determine whether a reconfiguration of reference oscillator 102 is necessary. For example, in some cases, a current configuration of reference oscillator 102 can support the requirements of multiple subsystems, so a reconfiguration may not be necessary. If controller 101 determines that reference oscillator 102 needs to be reconfigured, controller 101 will issue a control command 118 initiating a reconfiguration of reference oscillator 102 to meet the requirements of the subsystem associated with the request to be processed. However, in an embodiment, controller 101 first notifies subsystems 104-116 of an upcoming change to reference oscillator 102 to mitigate any potential negative impact of the reconfiguration of reference oscillator 102 on subsystems 104-116. For example, in an embodiment, controller 101 can send a message to subsystems 104-116 informing them of the upcoming changes to the characteristics of reference oscillator 102. This message can contain information regarding the upcoming changes to frequency, amplitude, noise, thermal stability, etc. of the reference oscillator.

In an embodiment, if subsystems 104-116 determine that the new characteristics of reference oscillator 102 will not meet their sub-system requirements (e.g., as dictated by a standard or by hardware requirements), subsystems 104-116 can take action to mitigate negative impacts of the reconfiguration of reference oscillator 102. For example, in an embodiment, each of subsystems 104-116 has a corresponding frequency synthesizer and/or phase lock loop (PLL) 122, and subsystems 104-116 use the signal from reference oscillator 102 as an input or reference to their PLL, which can contain another oscillator, such as a voltage controlled oscillator (VCO). By tuning this internal oscillator, subsystems 104-116 can adjust their own internal circuitry in response to an upcoming change in the frequency of the reference oscillator 102 so that they are not negatively impacted by an upcoming reconfiguration of the reference oscillator 102. When reference oscillator 102 is reconfigured to its original "nominal" state, these internal oscillators can be retuned to their original frequency or settings.

In some cases, retuning internal oscillators in subsystems 104-116 may not be sufficient to compensate for a change to the characteristics of reference oscillator 102. In such an instance, subsystems 104-116 can take further action to mitigate negative impacts of the reconfiguration of reference oscillator 102. For example, subsystems 104-116 can temporarily shut down, go to sleep, reduce data rate, etc., until reference oscillator 102 returns to a nominal state that is more favorable to their operation.

In some embodiments, controller 101 may instruct subsystems 104-116 to take certain action before reference oscillator 102 is reconfigured. For example, in some embodiments, controller 101 accesses information regarding reference oscillator requirements and/or specifications for each subsystem. If controller 101 determines that reconfigured reference oscillator 102 will no longer meet the requirements of a subsystem, controller 101 can instruct the subsystem to alter their internal circuitry to compensate for the upcoming changes to reference oscillator 102. Alternatively, controller 101 can instruct subsystems 104-116 to temporarily shut down, sleep, reduce data rate, etc., to mitigate the impact of the reconfiguration of reference oscillator 102.

In an embodiment, subsystems 104-116 can take steps to mitigate negative impacts of reconfigured reference oscillator 102 after it has already been reconfigured. For example, in an embodiment, subsystems 104-116 can detect a change in reference oscillator 102 without receiving any notification of a reconfiguration from controller 101. For example, subsystems 104-116 may detect that the frequency, amplitude, noise, etc. of the signal from reference oscillator 102 no longer meets subsystem requirements. In such a case, subsystems may alter their internal circuitry to adjust for an upcoming change to reference oscillator 102 or decide to temporarily shut down, sleep, reduce data rate, etc.

As previously discussed, some subsystems may have to temporarily deactivate (e.g., shut down, sleep, reduce data rate, etc.) to avoid potential negative impacts of a reconfiguration of reference oscillator 102. However, once reference oscillator 102 has become reconfigured again, these subsystems may be able to reactivate. In an embodiment, controller 101 can issue instructions to currently inactive subsystems, once reference oscillator 102 has been reconfigured so as to meet the requirements of these subsystems. For example, controller 101 can instruct these subsystems to reconfigure internal circuitry, power up, exit sleep mode, increase data rate, etc., once the reference oscillator has been reconfigured to an operating state that meets their respective requirements for the reference oscillator. In some embodiments, subsystems 104-116 can automatically detect the reconfiguration of the reference oscillator and can reconfigure internal circuitry, power up, exit sleep mode, increase data rate, etc., without receiving an instruction to do so from controller 101.

2.3 Reconfiguration of Reference Oscillator

After controller 101 has notified subsystems 104-116 of the upcoming reconfiguration of reference oscillator 102, controller 101 can issue a control command 118 initiating a reconfiguration of reference oscillator 102 to meet the requirements of the subsystem associated with the request to be processed (i.e., the highest priority request). For example, to process an incoming call, controller 101 issues a control command 118 initiating a reconfiguration of reference oscillator 102 to meet the requirements of cellular subsystem 104. As previously discussed, in an embodiment, these requirements may be specified in the request by preferred operating characteristics for reference oscillator 102. After the highest priority request has been processed, controller 101 can process all remaining requests, in order of priority, until all requests have been processed. If no requests remain to be processed, controller 101 can issue a command to reconfigure reference oscillator 102 to a nominal (i.e., default) state.

As previously discussed, controller 101 issues control command 118 to initiate a reconfiguration of reference oscillator 102. Using control command 118, controller 101 retunes reference oscillator 102 to meet the requirements of the subsystem associated with the highest priority request. In an embodiment, control command 118 is a set of one or more instructions that initiate a reconfiguration of one or more properties of reference oscillator 102. For example, control command 118 can reconfigure reference oscillator 102 to support different requirements for properties such as center frequency, signal amplitude, noise, thermal stability, etc. according to the requirements of the associated subsystem (e.g., requirements imposed by a corresponding standard or by hardware and/or software used to implement the various subsystems).

As previously discussed, the requesting subsystems can notify controller 101 of new preferred characteristics for the reference oscillator in the request. However, it should be understood that, in an embodiment, controller 101 does not have to use preferred characteristics sent in a request to reconfigure reference oscillator 102. For example, in an embodiment, controller 101 can access a table of optimal reference oscillator characteristics for each subsystem. When controller 101 decides to process a request from a particular subsystem, controller 101 can access this table, determine optimal reference oscillator characteristics for the particular subsystem based on the information in this table, and proceed to reconfigure reference oscillator 102 based on these optimal characteristics.

2.4 Method of Arbitrating Requests

Figure 2:
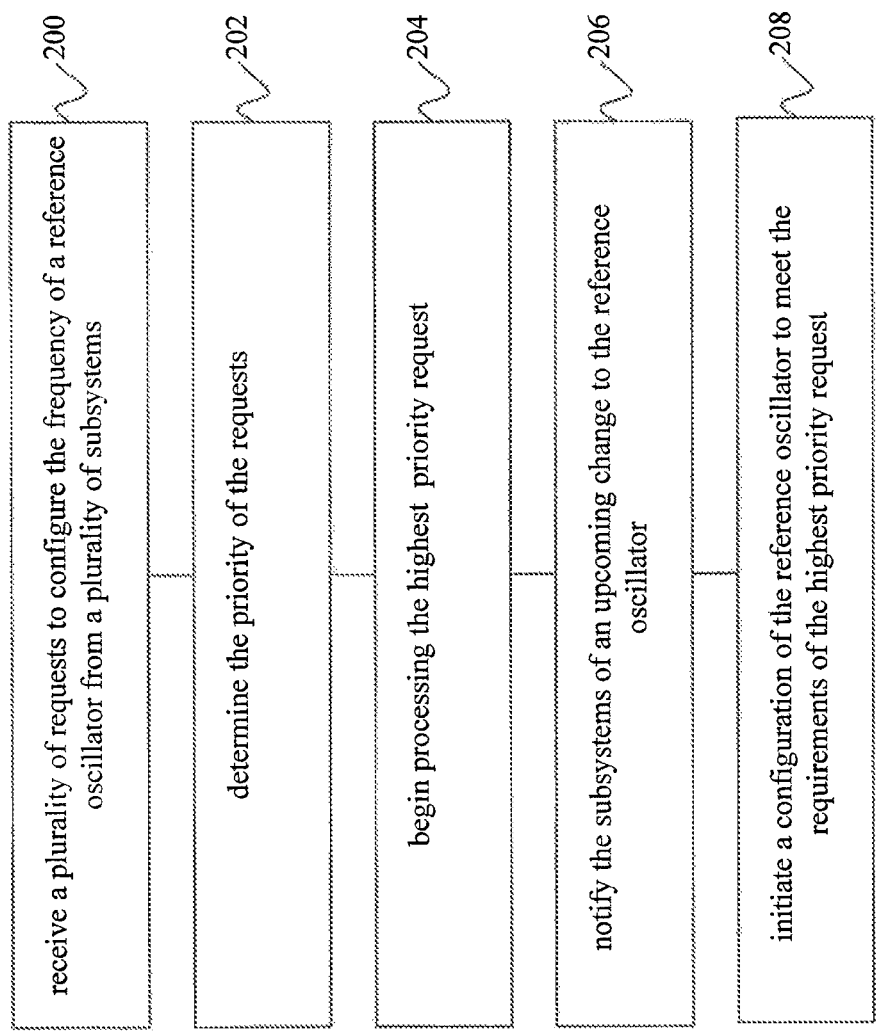
FIG. 2 is a flowchart of a method of arbitrating requests to change the frequency of a reference oscillator shared among a plurality of subsystems.

A method of arbitrating requests to change the frequency of a reference oscillator shared among a plurality of subsystems will now be described with reference to FIG. 1 and FIG. 2. In step 200, a plurality of requests to configure the frequency of a reference oscillator are received. For example, controller 101 can receive a plurality of requests to configure the frequency of reference oscillator 102 from subsystems 104-116. In step 202, the priority of the requests is determined. For example, controller 101 may determine (e.g., based on a priority list) that a request from cellular subsystem 104 should be given a higher priority than a request from WLAN subsystem 108. After controller 101 has prioritized the requests, controller 101 begins processing the highest priority request in step 204. However, in an embodiment, controller 101 first notifies other subsystems of the upcoming changes to reference oscillator 102 before initiating a reconfiguration.

In step 206, the subsystems can be notified of an upcoming change to the reference oscillator. For example, in an embodiment, controller 101 can send a message to subsystems 104-116 informing them that controller 101 will soon be changing the frequency of reference oscillator 102 to a new value. These subsystems can then take action to mitigate any potential negative impact of the reconfiguration of reference oscillator 102. Controller 101 may also optionally take action to mitigate the impact of a reconfiguration of reference oscillator 102 on subsystems 104-116. For example, if the characteristics of reconfigured reference oscillator 102 no longer meet the specifications and/or requirements of any of subsystems 104-116, controller 101 can minimize the impact of this reconfiguration on these subsystems (e.g. by instructing them to reconfigure internal circuitry, power down, enter sleep mode, decrease their data rate, etc.).

In step 208, a configuration of the reference oscillator to meet the requirements of the highest priority request is initiated (e.g., by control command 118). For example, controller 101 can initiate a configuration of reference oscillator 102 to meet the specifications and/or requirements of cellular subsystem 104. As previously discussed, controller 101 issues control command 118 to initiate a reconfiguration of reference oscillator 102 to meet the requirements of the subsystem associated with the highest priority request. In an embodiment, control command 118 is a set of one or more instructions that initiate a reconfiguration of one or more properties of reference oscillator 102.

After controller 101 has finished processing the request, controller 101 can then begin to process the next highest priority request. If no requests remain to be processed, controller 101 can issue a command to reconfigure reference oscillator 102 to a nominal (i.e., default) state. Reference oscillator 102 can remain in this nominal state until controller 101 receives another reconfiguration request.

2.5 Example

An example of arbitrating requests to change the frequency of a reference oscillator shared among a plurality of subsystems will now be described with reference to FIG. 1. During a cellular handover, cellular subsystem 104 can be directed to a specific channel where RF performance is known to be impaired if the frequency of reference oscillator 102 is within a certain range. Since this will pose a problem for proper cellular operation, a request can be sent to controller 101 to adjust the frequency of reference oscillator 102 to a frequency outside this problematic range. This request can optionally contain information identifying a requested frequency region for proper operation of cellular subsystem 104. In an embodiment, this request can be generated by cellular subsystem 104 to controller 101. In another embodiment, controller 101 can detect potential RF performance impairment and can generate the request itself.

Because this request concerns cellular subsystem 104, this request will likely be given a high priority. After controller 101 determines that this request should be processed (e.g., when the request becomes the highest priority request), controller 101 takes action to mitigate any negative impact of the reconfiguration of reference oscillator 102 on subsystems 104-116. For example, in an embodiment, controller 101 can notify subsystems 104-116 of the upcoming change to the characteristics of reference oscillator 102 and/or can instruct them to adjust (e.g., by instructing them to reconfigure internal circuitry, temporarily shut down, go to sleep, decrease data rate, etc.) if necessary. Controller 101 then initiates a configuration change of reference oscillator 102 (e.g., to change its frequency) by sending control command 118, which causes the frequency of reference oscillator 102 to move to the requested region for proper operation of cellular subsystem 104.

When a cellular handover to a non-impaired channel occurs, cellular subsystem 104 can request the restoration of the frequency of reference oscillator 102 to the nominal operation state (e.g., a nominal operating frequency). Once this request becomes the highest priority request, controller 101 can notify subsystems 104-116 of an upcoming change to the characteristics of reference oscillator 102 and/or can instruct them to adjust (e.g., by instructing them to reconfigure internal circuitry, restart, wake from sleep, increase data rate t nominal, etc.) if necessary. Controller 101 can then initiate a reconfiguration of reference oscillator 102 to the nominal operation state.

3. Arbitration Based on Parameters that Impact Multiple Subsystems

In some embodiments, controller 101 can configure subsystems 104-116 based on parameters that impact multiple subsystems including: geographic awareness, spectrum occupation awareness, and determining availability of Assisted GPS (AGPS) functionality. To do so, controller 101 communicates with each of subsystems 104-116 and knows the status of each subsystem. By taking these additional parameters into consideration when configuring subsystems 104-116, further optimization of communications system 100 can be achieved. Systems and methods for implementing geographic awareness, spectrum occupation awareness, and AGPS functionality will now be described.

3.1 Geographic Awareness

In many geographic regions of the Earth, a specific cellular/WiFi/Bluetooth frequency band-mix is supported. This frequency band-mix can differ from the band-mix supported in other regions. For example, frequency bands assigned to any of subsystems 104-116 in a first geographic region (e.g., North America) may differ from frequency bands assigned to any of subsystems 104-116 in a second geographic region (e.g., Japan). Because an optimal frequency band configuration for subsystems 104-116 can vary with geography, subsystems 104-116 should ideally be configured based on the current geographic location. Further, by configuring communications system 100 based on the current geographic location, certain requirements imposed by local standards can be ignored when the communications system is not within a certain geographic region. For example, if there is no Global System for Mobile Communications (GSM) network in the present geographic location (e.g., Japan), the requirements of the GSM standard do not have to be satisfied by communications system 100, which allows for more flexibility in configuring the other subsystems 104-116.

In an embodiment, subsystems 104-116 can be configured based on the frequency spectrum allocation in a particular geographic region. Subsystems 104-116 can be configured to recognize the current geographic region upon wake-up, upon exiting a standby mode, or by periodically checking the current geographic region. For example, when cellular subsystem 104 does a scan and identifies a cellular network, it can determine which geographic region communications system 100 is in based on the unique identifier of the cellular service provider. Alternatively, GPS/GNSS subsystem 106 can also initiate a check of the current geographic region and can send a message to controller 101 if the current geographic region has changed.

In an embodiment, controller 101 can keep track of the current geographic region and can determine if the current geographic region has changed (e.g., by initiating a check after a wake-up of communications system 100. If controller 101 detects a change in the current geographic region, controller 101 can initiate a reconfiguration of communications system 100 for the new geographic region. In an embodiment, reconfiguring communications system 100 can require accessing information regarding the supported frequency bands for subsystems 104-116 in the new geographic region. Frequency band information can be acquired in many ways. For example, frequency band information indicating a supported frequency range in the geographic location for cellular communications may be conveyed to communications system 100 when cellular subsystem 104 connects to a service provider. Controller 101 may then select a frequency for reference oscillator 102 based on this supported frequency range. For example, controller 101 may determine that reference oscillator 102 should be tuned to the middle of this frequency range. In an embodiment, frequency band information for WLAN subsystem 108, Bluetooth subsystem 110, and NFC subsystem 114 can also be obtained in a similar fashion when communications system 100 scans for local Bluetooth devices, NFC devices, and WiFi networks.

In an embodiment, frequency band information may be stored in a memory (not shown) of communications system 100 accessible by controller 100. For example, this stored frequency band information may contain information regarding optimal frequency bands for subsystems 104-116 depending on the geographic location of communications system 100. In an embodiment, this stored frequency band information can be periodically updated to ensure accuracy. Alternatively, frequency band information can be downloaded (e.g., from one or more service providers) whenever controller 101 detects a change in the current geographic location. Controller 101 can use this frequency band information to determine new optimal or preferred frequency bands for subsystems.

Once controller 101 has determined the new optimal frequency bands for subsystems 104-116, controller 101 can initiate a reconfiguration of reference oscillator 102 to a new optimal frequency value based on the current geographic location. Before reference oscillator 102 is retuned, subsystems 104-116 can adjust their internal circuitry (e.g., internal PLLs having VCOs) in anticipation of the change to reference oscillator 102. If one or more of subsystems 104-116 is not adequately supported in any geographic region, these subsystems can be temporarily shut down, put to sleep, or operate at a decreased data rate. After reference oscillator 102 and subsystems 104-116 have been reconfigured, communications system 100 should be ideally configured for operation in the new geographic location.

Figure 3:
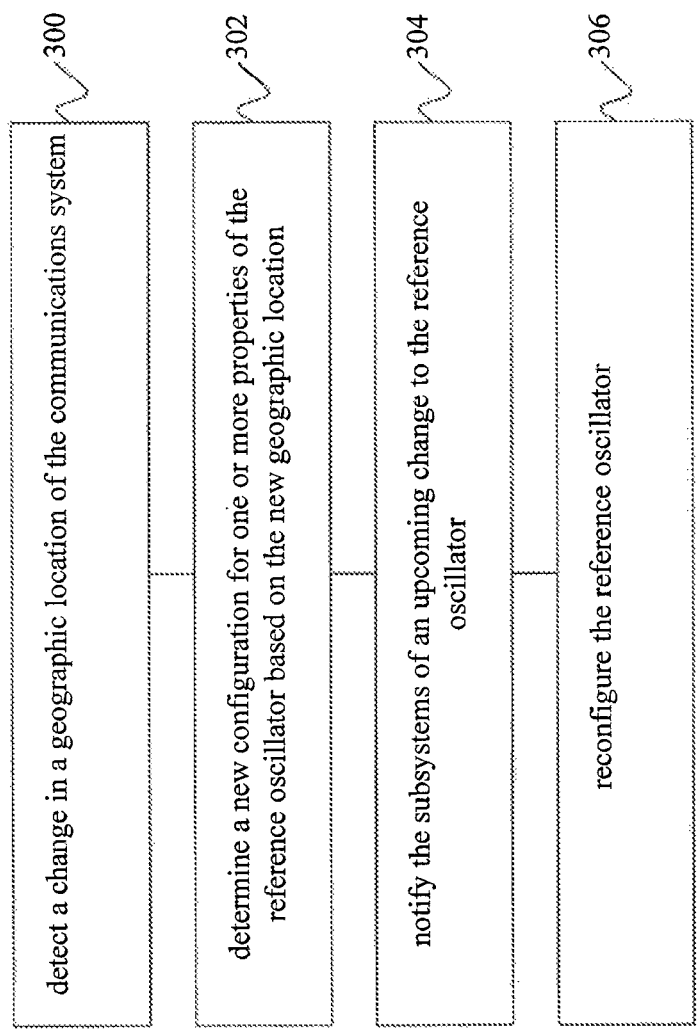
FIG. 3 is a flowchart of a method for configuring a plurality of subsystems sharing a reference oscillator based on geographic awareness.

A method for configuring a plurality of subsystems sharing a reference oscillator based on geographic awareness will now be described with reference to FIG. 3 and FIG. 1. In step 300, a change in the geographic location of communications system 100 is detected. For example, when cellular subsystem 104 does a scan and identifies a cellular network, it can determine the geographic region that communications system 100 is located in, based on the unique identifier of the cellular service provider and can relay this information to controller 101. In an embodiment, the service provider also informs communications system about the range of supported frequencies, for cellular communications in the geographic region. In step 302, a new frequency for the reference oscillator (or a new configuration of other reference oscillator properties, such as noise properties) is determined based on the new geographic location. For example, in an embodiment, controller 101 can select a new frequency for reference oscillator 102 to improve cellular communications based on the supported frequency range for cellular communications in the geographic region. In another embodiment, controller 101 can select new noise properties for reference oscillator 102.

In step 304, subsystems 104-116 can be notified of an upcoming change to the reference oscillator. For example, in an embodiment, controller 101 can send a message to subsystems 104-116 informing them that controller 101 will soon be changing the frequency or some other characteristic of reference oscillator 102 to a new value. These subsystems can then take action to mitigate any potential negative impact of the reconfiguration of reference oscillator 102. In step 306, controller 101 tunes the reference oscillator to the new frequency or modifies some other characteristic of reference oscillator 102. For example, controller 101 can initiate a configuration of reference oscillator 102 using control command 118.

3.2 Spectrum Occupation Awareness

Each of subsystems 104-116 can (simultaneously or sequentially) occupy portions of a frequency spectrum. As previously discussed, the specific spectrum segments used for reception and transmission of data for any of subsystems 104-116 can vary based on geographic location. In certain instances (e.g., due to a current spectrum allocation and/or congestion) the operation of one subsystem may negatively impact the operation of another subsystem.

For example, in an embodiment, cellular subsystem 104 can be assigned approximately forty bands for cellular operation (e.g., 3G and 4G) from 700 MHz to 3.5 GHz. WLAN subsystem 108 can be assigned a frequency band from 2.5 GHz to 5 GHz for WLAN/WiFi functionality. Bluetooth subsystem 110 can operate at 2.5 GHz, and GPS/GNSS subsystem 106 can operate at 1.5 GHz. However, it should be understood that these values are provided as examples and are not limiting. As illustrated by the values provided above, the frequency bands assigned to subsystems can overlap. This overlap can cause a negative impact on performance. For example, WiFi communications using WLAN subsystem 108 may negatively impact a 4G (fourth generation cellular wireless standard) channel if the frequency spectrum allocated to WLAN is too close to the frequency spectrum allocated to the 4G channel. In an embodiment, controller 101 can be configured to use spectrum occupation awareness to avoid such a conflict between subsystems.

For example, in an embodiment, controller 101 is aware of the current air spectrum occupation and arbitrates requests from subsystems 104-116 based on which subsystems are receiving and transmitting and which frequencies and/or spectrum segments are being used for reception and transmission of data. Controller 101 can use this information to minimize congestion, to better address Quality of Service (QoS) requirements by achieving the best use of subsystems 104-116, to minimize unnecessary subsystem downtime, and/or to alleviate RF receiver blocking conditions (i.e., conditions in a receiver where an oft-frequency signal causes the received signal to be suppressed).

In an embodiment, the channel allocation for non-cellular subsystems (e.g., WLAN subsystem 108 and Bluetooth subsystem 110) can dictated by communications system 100 (e.g., via controller 101). However, the channel allocation for cellular functionality is dictated by the cellular service provider network. For example, information regarding a frequency spectrum used for cellular communications can be sent to communications system 100 when communications system 100 communicates with a cellular service provider (e.g., through a base station). Thus, in an embodiment, controller 101 can reallocate channels used by non-cellular subsystems so that these channels do not interfere with the channels dictated by the cellular network.

For example, if the frequency spectrum allocated to WLAN is close to the 4G frequency spectrum, controller 101 can ensure that WLAN does not operate at a frequency spectrum that would negatively impact 4G communications. In an embodiment, controller 101 can temporarily assign a different and/or smaller frequency spectrum to WLAN if 4G communications are active. For example, controller 101 may send a message to WLAN subsystem 108 with instructions to tune the internal circuitry of WLAN subsystem 108 to use a different frequency range or a smaller frequency spectrum within the current frequency range.

Controller 101 can also prevent non-cellular subsystems from causing negative impacts on cellular subsystem 104 by assigning different (e.g., non-simultaneous) time slots to non-cellular subsystems (e.g., to WLAN subsystem 108 and Bluetooth subsystem 110) so that these non-cellular subsystems are not active while cellular subsystem 104 is active. Additionally, controller 101 can exploit cellular discontinued reception/transmission (DRX/DTX) gaps to allow non-cellular subsystems to be active (i.e., transmitting and receiving data) at the same time cellular subsystem 104 is active. In other words, controller 101 can assign time slots to non-cellular subsystems so that they are only active when cellular subsystem 104 encounters a DRX/DTX gap. Alternatively, controller 101 may temporarily disable use of WLAN (e.g., by temporarily shutting WLAN subsystem 108 off or putting WLAN subsystem 108 into a sleep mode) if 4G communications are active.

Figure 4:
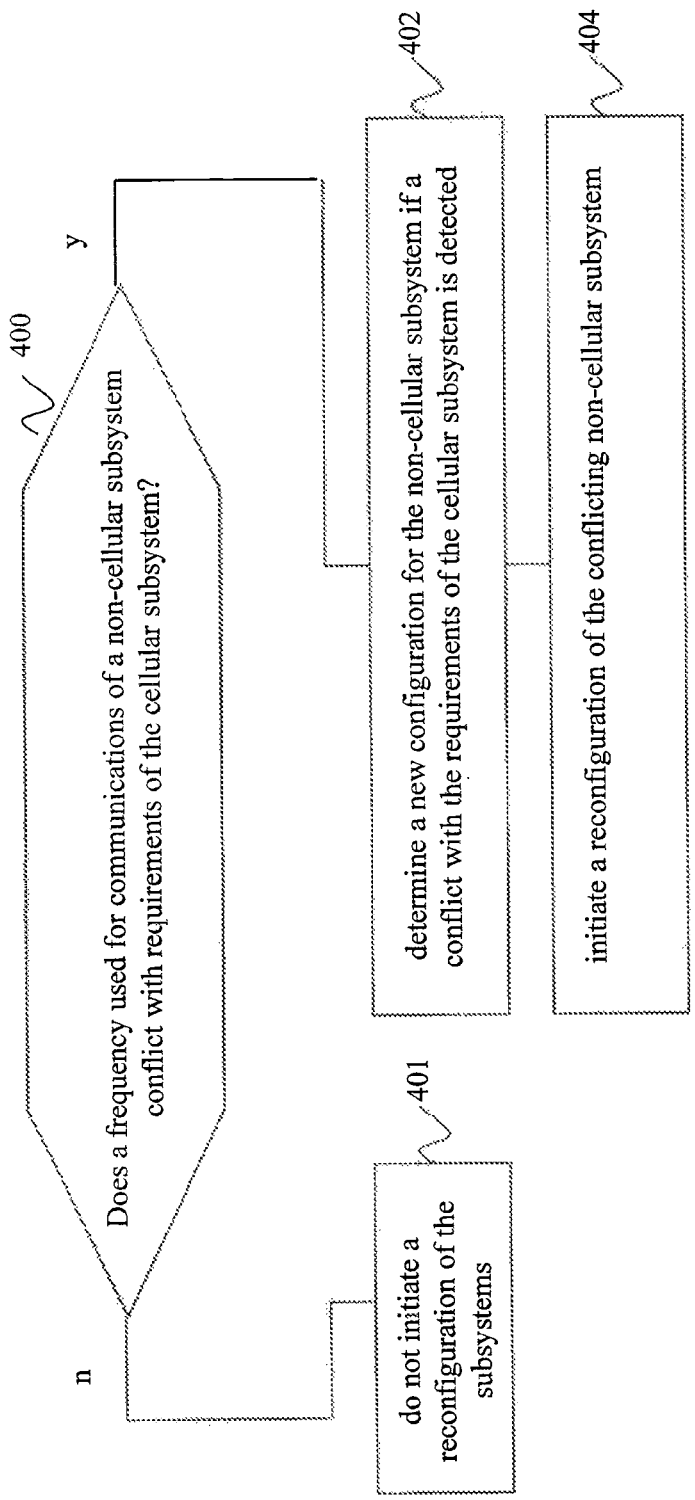
FIG. 4 is a flowchart of a method for configuring a plurality of subsystems sharing a reference oscillator based on spectrum occupation awareness.

A method for configuring a plurality of subsystems sharing a reference oscillator based on spectrum occupation awareness will now be described with reference to FIG. 4 and FIG. 1. In step 400, a determination is made regarding whether a frequency used for communications of a non-cellular subsystem conflicts with requirements of cellular subsystem 104. For example, WiFi communications using WLAN subsystem 108 may conflict with the requirements from cellular subsystem 104 due to an overlapping frequency range used for both WiFi and cellular communications. This overlapping frequency range can result in, for example, unwanted interference, blocking conditions, congestion, unnecessary subsystem downtime, and/or RF receiver blocking conditions.

If no subsystem conflict is detected in step 400, no subsystem reconfiguration is initiated in step 401. If a subsystem conflict is detected in step 400, a new configuration for the non-cellular subsystem is determined in step 402. For example, controller 101 may determine that the conflict between the subsystems can be resolved by temporarily assigning a different and/or smaller frequency range to the conflicting subsystem (e.g., WLAN subsystem 108) while cellular communications are active. In an embodiment, controller 101 sends a message to the conflicting subsystem instructing it to alter its internal circuitry (e.g., by adjusting its internal oscillator(s)) so that it operates at a smaller frequency range.) Alternatively, controller 101 may determine that the conflict between the subsystems can be resolved by assigning different (e.g., non-simultaneous) time slots to the conflicting non-cellular subsystem (e.g., to WLAN subsystem 108) so that it is not active while cellular subsystem 104 is active. In an embodiment, controller 101 can assign time slots to the conflicting non-cellular subsystem so that it is only active when cellular subsystem 104 encounters a DRX/DTX gap. In step 404, controller 101 initiates a reconfiguration of the non-cellular subsystem. For example, controller 101 can instruct the conflicting subsystem (e.g. WLAN subsystem 108) to use a different and/or smaller frequency range or can assign time slots to the conflicting subsystem so that the conflict is resolved.

3.3 Minimizing Impact of GPS Sensitivity Requirements

While channel allocation can be dynamically changed for certain non-cellular subsystems (e.g., WLAN subsystem 108 and Bluetooth subsystem 110), channel allocation cannot be easily changed for GPS/GNSS subsystem 106 due to GPS/GNSS sensitivity requirements (e.g., because the GPS/GNSS input signal from a satellite is very low relative to the input signals from other subsystems). In some geographic locations, Assisted Global Positioning System (AGPS) is available. AGPS uses a cellular network for triangulation and improves on GPS functionality. For example, AGPS can improve GPS performance and can obtain a faster time to first fix (TTFF). Because AGPS employs terrestrial cellular network equipment, the signal from AGPS is much stronger than a GPS signal from a satellite.

In an embodiment, GPS/GNSS subsystem 106 can use AGPS, when available, for location detection functionality. Controller 101 can initiate a switch to AGPS, Because the AGPS signal is stronger, switching to AGPS enables communications system 100 to have more degrees of freedom for configuring other subsystems without interrupting a GPS lock or creating interference with a GPS receiver. Further, AGPS can operate in a different frequency band than GPS, which provides controller 101 with even more flexibility to configure subsystems 104-116.

Figure 5:
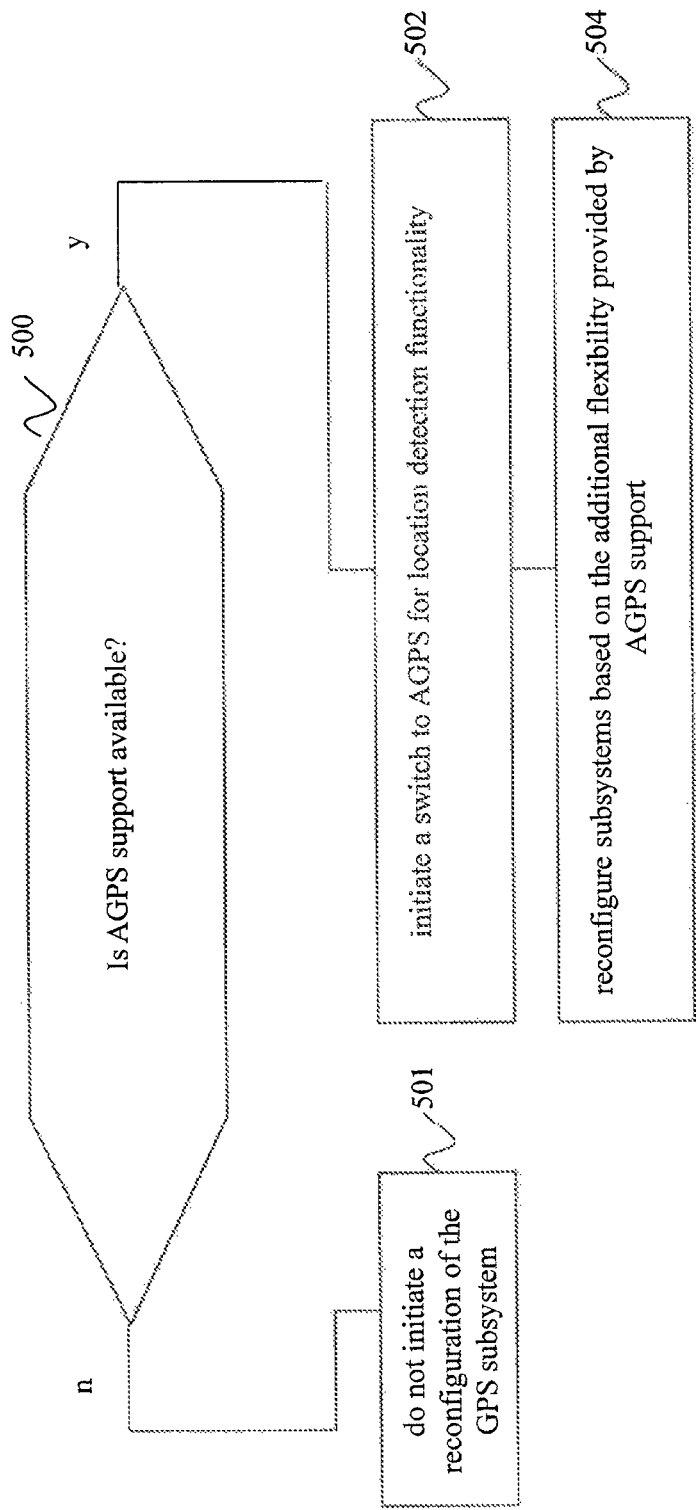
FIG. 5 is a flowchart of a method for configuring a plurality of subsystems sharing a reference oscillator based on availability of Assisted GPS (AGPS) functionality.

A method for configuring a plurality of subsystems sharing a reference oscillator based on availability of Assisted GPS (AGPS) functionality will now be described with reference to FIG. 5 and FIG. 1. In step 500, a determination is made regarding whether AGPS support is available. For example, GPS/GNSS subsystem 106 can periodically perform a scan for AGPS-enabled service providers and can relay this information to controller 101. If no AGPS support is available, then no GPS subsystem reconfiguration is initiated in step 501. If AGPS support is available, then a switch to AGPS for location detection functionality is initiated in step 502. For example, controller 101 can instruct GPS/GNSS subsystem 106 (and/or cellular subsystem 104) to switch to AGPS. As discussed above, because AGPS functionality gives communications system more degrees of freedom for configuring other subsystems, and because AGPS can operate in a different frequency band than GPS, switching to AGPS gives communications system 100 more flexibility for configuring other subsystems.

In step 504, the subsystems of communications system 100 are reconfigured based on the additional flexibility provided by AGPS support. For example, if AGPS uses a different frequency band than GPS, controller 101 can retune the circuitry of other subsystems to include a frequency range previously used by GPS. Further, because the decreased sensitivity requirements caused by the switch to AGPS can enable the subsystems to use larger frequency bands without interfering with AGPS calculations, controller 101 can instruct the subsystems of communications system 100 to tune internal circuitry so that larger frequency bands are used.

4. Example Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 6:
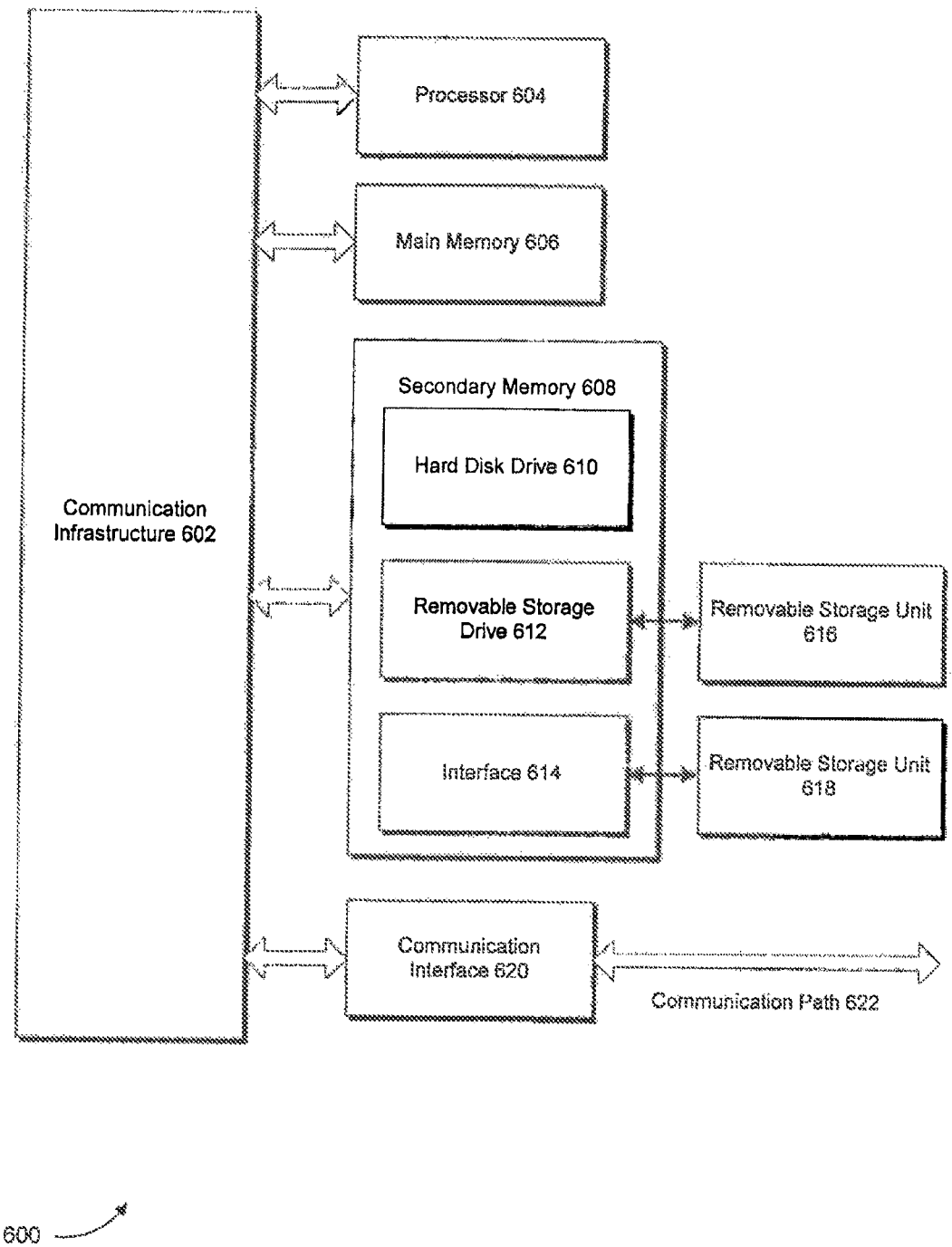
FIG. 6 illustrates an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 600 is shown in FIG. 6. At least portions of some, or all, of the modules depicted in FIG. 1 (e.g., controller 101, subsystems 104-116, etc.), can be implemented using one or more distinct computer systems 600. Furthermore, each of the steps of the flowcharts depicted in FIGS. 2-5 can be implemented on one or more distinct computer systems 600.

Computer system 600 includes one or more processors, such as processor 604. Processor 604 can be a special purpose or a general purpose digital signal processor. Processor 604 is connected to a communication infrastructure 602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 600 also includes a main memory 606, preferably random access memory (RAM), and may also include a secondary memory 608. Secondary memory 608 may include, for example, a hard disk drive 610 and/or a removable storage drive 612, representing a floppy disk drive, a magnetic tape drive, an optical disk drive, or the like. Removable storage drive 612 reads from and/or writes to a removable storage unit 616 in a well-known manner. Removable storage unit 616 represents a floppy disk, magnetic tape, optical disk, or the like, which is read by and written to by removable storage drive 612. As will be appreciated by persons skilled in the relevant art(s), removable storage unit 616 includes a computer usable storage medium having stored therein computer software and/or data.

In alternative implementations, secondary memory 608 may include other similar means for allowing computer programs or other instructions to be loaded into computer system 600. Such means may include, for example, a removable storage unit 618 and an interface 614. Examples of such means may include a program cartridge and cartridge interface (such as that found in video game devices), a removable memory chip (such as an EPROM, or PROM) and associated socket, a thumb drive and USB port, and other removable storage units 618 and interfaces 614 which allow software and data to be transferred from removable storage unit 618 to computer system 600.

Computer system 600 may also include a communications interface 620. Communications interface 620 allows software and data to be transferred between computer system 600 and external devices. Examples of communications interface 620 may include a modem, a network interface (such as an Ethernet card), a communications port, a PCMCIA slot and card, etc. Software and data transferred via communications interface 620 are in the form of signals which may be electronic, electromagnetic, optical, or other signals capable of being received by communications interface 620. These signals are provided to communications interface 620 via a communications path 622. Communications path 622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 616 and 618 or a hard disk installed in hard disk drive 610. These computer program products are means for providing software to computer system 600.

Computer programs (also called computer control logic) are stored in main memory 606 and/or secondary memory 608. Computer programs may also be received via communications interface 620. Such computer programs, when executed, enable the computer system 600 to implement the present disclosure as discussed herein. In particular, the computer programs, when executed, enable processor 604 to implement the processes of the present disclosure, such as any of the methods described herein. Accordingly, such computer programs represent controllers of the computer system 600. Where the disclosure is implemented using software, the software may be stored in a computer program product and loaded into computer system 600 using removable storage drive 612, interface 614, or communications interface 620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

5. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The representative signal processing functions described herein (e.g. channel and source decoders, etc.) can be implemented in hardware, software, or some combination thereof. For instance, the signal processing functions can be implemented using computer processors, computer logic, application specific circuits (ASIC), digital signal processors, etc., as will be understood by those skilled in the art based on the discussion given herein. Accordingly, any processor that performs the signal processing functions described herein is within the scope and spirit of the present invention.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g. software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A communications system comprising:
   a plurality of subsystems;
   a reference oscillator coupled to the plurality of subsystems, wherein the reference oscillator is configured to provide a reference signal to the plurality of subsystems; and
   a controller coupled to the reference oscillator and the plurality of subsystems, wherein the controller is configured to:
   receive, from a first subsystem in the plurality of subsystems, a request to change a characteristic of the reference oscillator,
   determine, based on a priority of the request, whether to process the request,
   send, in response to determining that the request should be processed, a notification to the plurality of subsystems of an upcoming change to the characteristic of the reference oscillator,
   initiate, in response to determining that the request should be processed, a reconfiguration of the reference oscillator to meet a requirement of the first subsystem,
   determine whether performance of one or more subsystems in the plurality of subsystems will be impaired by the reconfiguration of the reference oscillator, and
   mitigate an impact on the one more subsystems in the plurality of subsystems by initiating a frequency tuning of respective one or more internal oscillators of the one or more subsystems in the plurality of subsystems.

2. The system of claim 1, wherein the plurality of subsystems are configured to temporarily de-activate in response to receiving the notification.

3. The system of claim 1, wherein the plurality of subsystems comprise:
   a cellular subsystem;
   a Global Positioning System (GPS) subsystem;
   a wireless local area network (WLAN) subsystem;
   a Bluetooth subsystem; and
   a near field communications (NFC) subsystem.

4. The system of claim 1, wherein the controller is further configured to:
   detect a change in a geographic location of the communications system; and
   initiate a second reconfiguration of the reference oscillator based on the change in the geographic location of the communications system.

5. The system of claim 4, wherein the controller is further configured to:
   perform a scan for available cellular networks after a wake-up of the communications system has been initiated;
   receive information from the available cellular networks; and detect the change in the geographic location of the communications system based on the information from the available cellular networks.

6. The system of claim 1, wherein the controller is further configured to:
determine whether a frequency used for communications of a second subsystem conflicts with a frequency requirement of the first subsystem; and
reconfigure the second subsystem if the frequency used for communications of the second subsystem conflicts with the frequency requirement of the first subsystem.

7. The system of claim 6, wherein the controller is further configured to reconfigure the second subsystem by assigning a smaller frequency range to the second subsystem.

8. The system of claim 6, wherein the controller is further configured to reconfigure the second subsystem by assigning second time slots to the second subsystem that do not coincide with first time slots assigned to the first subsystem.

9. The system of claim 6, wherein the controller is further configured to reconfigure the second subsystem by assigning second time slots to the second subsystem, and wherein the second time slots coincide with discontinued reception/transmission (DRX/DTX) gaps encountered by the first subsystem.

10. The system of claim 1, wherein the controller is further configured to:
determine whether Assisted GPS (AGPS) support is available to the communications system; and
in response to determining that AGPS support is available:
initiate a switch to AGPS for location detection functionality of the communications system, and
reconfigure the plurality of subsystems based on the switch to AGPS.

11. The communications system of claim 1, wherein the reference oscillator was tuned to an initial frequency before the reference oscillator was reconfigured, and wherein the controller is further configured to:
initiate a reconfiguration of the reference oscillator to the initial frequency after the first subsystem has finished processing data using the reference oscillator.

12. A method comprising:
receiving, from a first subsystem in a plurality of subsystems of a communications system, a request to change a characteristic of a reference oscillator;
determining, based on a priority of the request, whether to process the request; and
in response to determining that the request should be processed:
sending a notification to the plurality of subsystems of an upcoming change to the characteristic of the reference oscillator,
initiating a reconfiguration of the reference oscillator to meet a requirement of the first subsystem,
determining whether performance of one or more subsystems in the plurality of subsystems will be by the reconfiguration of the reference oscillator, and
mitigating an impact on the one or more subsystems in the plurality of subsystems by initiating a frequency tuning of respective one or more internal oscillators of the one or more subsystems in the plurality of subsystems.

13. The method of claim 12, further comprising:
detecting a change in a geographic location of the communications system; and
initiating the reconfiguration of the reference oscillator based on the change in the geographic location of the communications system.

14. The method of claim 12, further comprising:
determining whether a frequency used for communications of a second subsystem conflicts with a frequency requirement of the first subsystem; and
assigning a smaller frequency range to the second subsystem if the frequency used for communications of the second subsystem conflicts with the frequency requirement of the first subsystem.

15. The method of claim 12, further comprising:
determining whether a frequency used for communications of a second subsystem conflicts with a frequency requirement of the first subsystem; and
assigning second time slots to the second subsystem that do not coincide with first time slots assigned to the first subsystem if the frequency used for communications of the second subsystem conflicts with the frequency requirement of the first subsystem.

16. The method of claim 12, further comprising:
determining whether Assisted GPS (AGPS) support is available to the communications system; and
in response to determining that AGPS support is available:
initiating a switch to AGPS for location detection functionality of the communications system, and
reconfiguring the plurality of subsystems based on the switch to AGPS.

17. A communications device comprising:
a plurality of wireless subsystems;
a reference oscillator coupled to the plurality of wireless subsystems, wherein the reference oscillator is configured to provide a reference signal to the plurality of wireless subsystems; and
a controller coupled to the reference oscillator and the plurality of wireless subsystems, wherein the controller is configured to:
receive, from the plurality of wireless subsystems, a plurality of requests to change a frequency of the reference oscillator;
prioritize the plurality of requests;
select, based on respective priorities of the plurality of requests, a first request in the plurality of requests;
determine, based on the frequency of the reference oscillator, whether to process the first request;
in response to determining that the first request should be processed:
send a notification to the plurality of wireless subsystems of an upcoming change to a characteristic of the reference oscillator,
initiate a first reconfiguration of the reference oscillator to meet a requirement of a first subsystem,
determine whether performance of one or more subsystems in the plurality of subsystems will be impaired by the reconfiguration of the reference oscillator, and
mitigate an impact on the one or more subsystems in the plurality of subsystems by initiating a frequency tuning of respective one or more internal oscillators of the one or more subsystems; and
initiate a second reconfiguration of the reference oscillator to adjust the frequency of the reference oscillator to a nominal value in response to determining that all requests in the plurality of requests have been processed.

18. The communications device of claim 17, wherein the controller is configured to:
determine the characteristic of the reference oscillator that will meet requirements of multiple wireless subsystems in the plurality of wireless subsystems;

prioritize the plurality of requests based on the characteristic; and initiate the first reconfiguration of the reference oscillator based on the characteristic.

19. The communications device of claim 17, wherein one or more phase lock loops (PLLs) comprise the one or more internal oscillators.

\* \* \* \* \*

UNITED STATES PATENT AND TRADEMARK OFFICE
CERTIFICATE OF CORRECTION

PATENT NO.        : 9,197,278 B2
APPLICATION NO.   : 13/463976
DATED             : November 24, 2015
INVENTOR(S)       : Haralabidis Page 1 of 1

It is certified that error appears in the above-identified patent and that said Letters Patent is hereby corrected as shown below:

In the claims,

Column 17, Line 55. Please replace "will be by the" with --will be impaired by the--.

Signed and Sealed this
Twenty-second Day of March, 2016

Michelle K. Lee
*Director of the United States Patent and Trademark Office*